United States Patent [19]

Mishima et al.

[11] Patent Number: 5,165,201
[45] Date of Patent: Nov. 24, 1992

[54] VEHICLE WEATHER STRIP

[75] Inventors: Kunio Mishima; Keizo Hayashi; Masahiro Nozaki, all of Aichi, Japan

[73] Assignee: Toyoda Gosei Co., Ltd., Nishikasugai, Japan

[21] Appl. No.: 672,828

[22] Filed: Mar. 21, 1991

[30] Foreign Application Priority Data

Mar. 26, 1990 [JP] Japan .................................. 2-76320
Apr. 12, 1990 [JP] Japan .................................. 2-96680

[51] Int. Cl.$^5$ .............................................. E06B 7/16
[52] U.S. Cl. .................................................... 49/490
[58] Field of Search ............... 49/490, 491, 498, 485, 49/479

[56] References Cited

U.S. PATENT DOCUMENTS

| | | | |
|---|---|---|---|
| 3,124,851 | 3/1964 | Straight et al. | 49/491 |
| 3,198,689 | 8/1965 | Lansing | 49/490 X |
| 3,793,772 | 2/1974 | Kouth | 49/490 X |
| 4,143,497 | 3/1979 | Offenbacher | 49/490 X |
| 4,304,816 | 12/1981 | Bright et al. | 49/491 X |
| 4,495,234 | 1/1985 | Tominaga et al. | 49/498 X |
| 4,517,233 | 5/1985 | Weichman | 49/490 X |
| 4,542,610 | 9/1985 | Weimar | 49/491 |
| 4,603,899 | 8/1986 | Iwasa . | |
| 4,926,600 | 5/1990 | Mesnel | 49/491 |
| 4,982,529 | 1/1991 | Mesnel | 49/491 |
| 4,991,352 | 2/1991 | Hyer | 49/491 X |

Primary Examiner—Renee S. Luebke
Assistant Examiner—Jerry Redman
Attorney, Agent, or Firm—Cushman, Darby & Cushman

[57] ABSTRACT

A weather strip including a trim part U-shaped in section, a hollow seal part joined to the trim part, and a core member made up of a plurality of U-shaped core pieces embedded in the trim part to the extent that the weather strip is not impaired in flexibility. Wires are embeded in the weather strip in such a manner that they are located near the joint and extend in the weather strip longitudinally. Hence, the weather strip can be engaged with a flange of a vehicle that varies three-dimensionally in posture and in direction.

6 Claims, 6 Drawing Sheets

FIG. 12 PRIOR ART

VEHICLE WEATHER STRIP

BACKGROUND OF THE INVENTION

1. Field of the Invention

This invention relates to weather strips provided along openings of an automobile.

2. Description of the Prior Art

The prior art concerning the invention will be described with reference to weather strips provided for the luggage room and a door window of an automobile.

In the case of the luggage room, a flange is formed along the opening of the luggage room, and a weather strip having a trim part and a seal part is fastened to the flange (U.S. Pat. No. 4,603,899).

Figure 7:
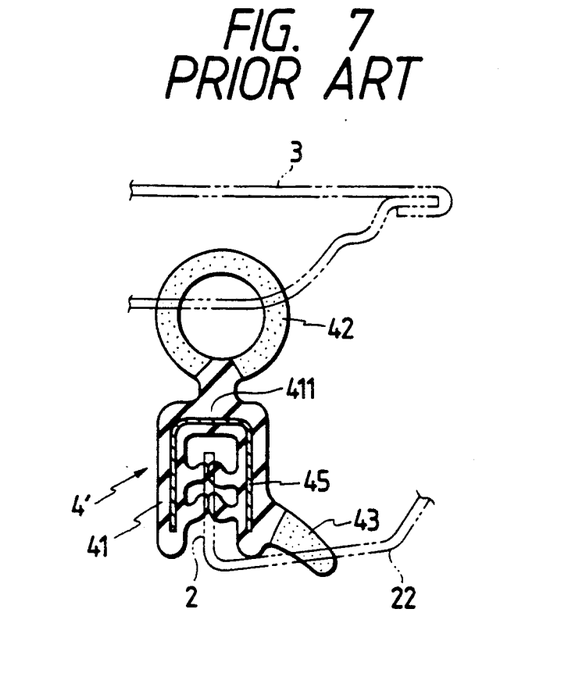
FIG. 7 is a sectional view showing a conventional weatherstrip.

A typical example of the weather strip of this type is as shown in FIG. 7. The weather strip 4' includes a trim part 41 which is fastened to the flange 2 of a panel 22 of the vehicle body and a hollow seal part 42 which extends from the trim part 41. More specifically, the trim part 41 is U-shaped in section having two opposite side walls, and the seal part 42 extends from the common top portion of the two opposite side walls, and is pushed by a luggage room door 3 from above. Generally, a core member 45 is buried in the trim part 41 so as to prevent the deformation of the latter 41, and the trim part 41 has a body seal lip 43 which is brought into contact with the body panel 22.

Figure 2:
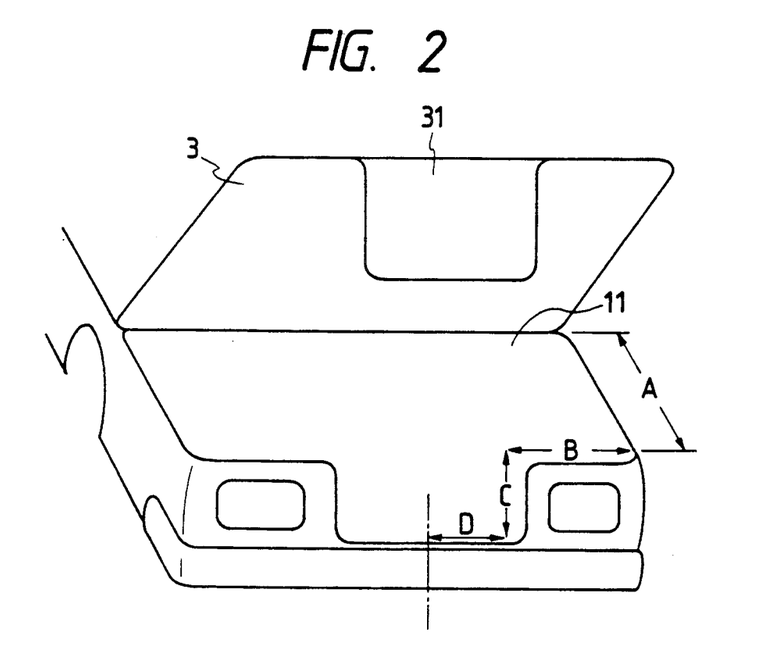
FIG. 2 is a perspective view showing an automobile's luggage room to which the weather strip of the present invention is applied.

There is a tendency to, in order to facilitate the loading of luggage in or the unloading of luggage from the luggage room, modify the luggage room in such a manner, as shown in FIG. 2, so that the middle portion of the rear wall is removed, and instead, a vertical wall 31 is added to the luggage room door 3.

In the case of the luggage room 11, a weather strip 4' should be fastened to the flange 2 in such a manner that the seal part 42 faces upward for the ranges A and B, and backward of the vehicle body for the ranges C and D. Accordingly, the flange 2 is protrudes upward between A and B, and protrudes backward between C and D. That is, the flange 2 is three-dimensionally changed in posture and in direction.

Figure 8:
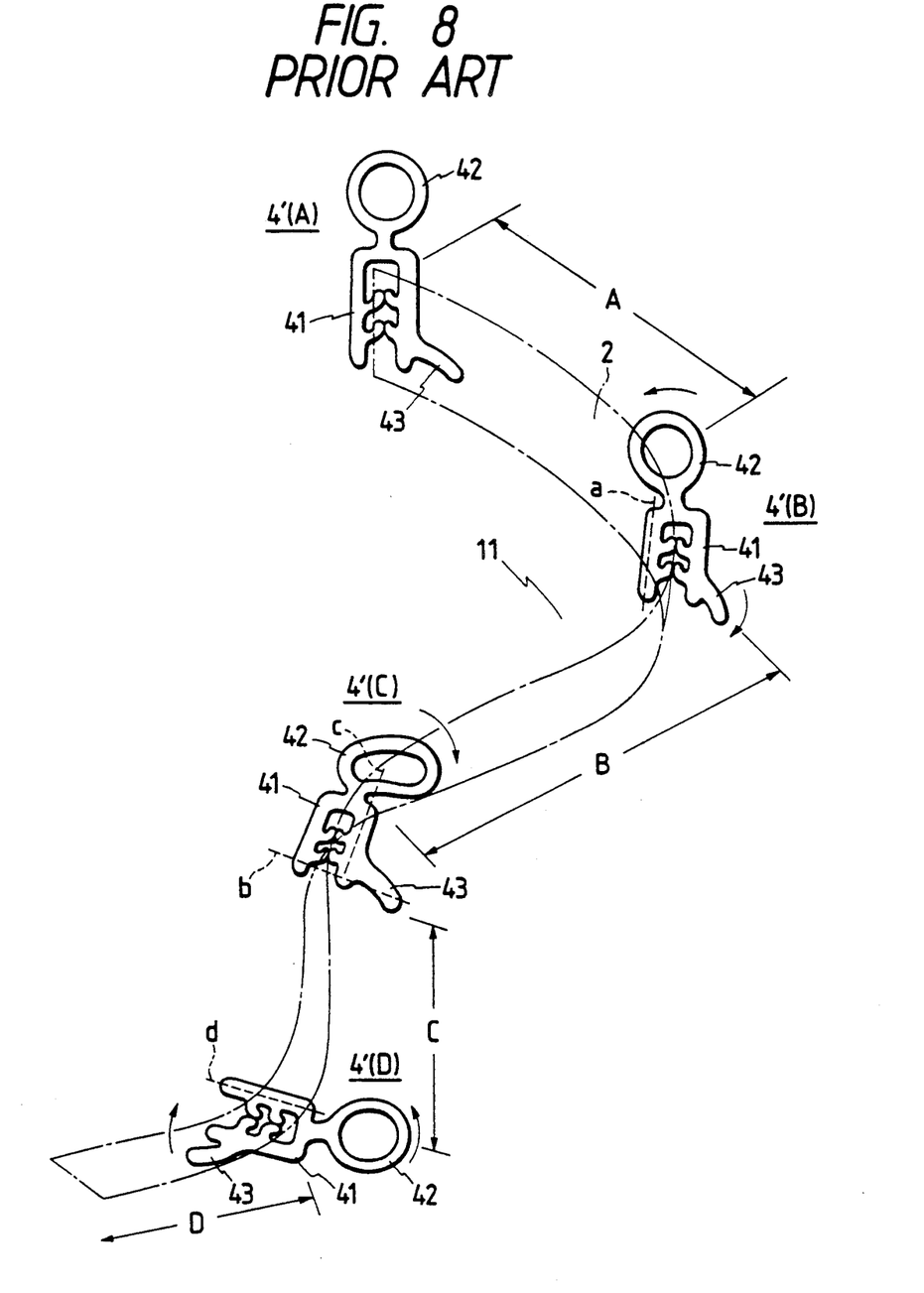
FIG. 8 is a drawing showing how the conventional weather strip is applied to an automobile's luggage room.

When the weather strip 4' is engaged with the flange 2, the hollow seal part 42 and the body seal lip 43 are deformed at the corners of the ranges A, B, C and D as shown in FIG. 8. In FIG. 8, reference character 4'(A) designates the weather strip 4' which is not deformed yet. At the corner between the ranges A and B, the weather strip 4' is bent substantially 90° with the seal part facing upward. In this case, as indicated at 4' (B) in FIG. 8, the bending central axis (a) is inside the luggage room 11, as a result of which the weather strip's portion outside the luggage room 11 is pulled, whereby the hollow seal part 42 falls inside of the luggage room 11 while the body seal lip 43 falls below the luggage room 11. At the corner between the ranges B and C, the weather strip 4' is bent about 90° and twisted in such a manner that the seal part 42 faces backwards from its upward direction. In this case, the bending central axes (b) and (c) are located as indicated at 4' (C). Therefore, the upper portion of the weather strip, as well as the portion of the weather strip that is located inside the luggage room 11, is pulled. As a result of this pulling, the hollow seal part 42 is deformed in such a manner that it falls outside the luggage room 11 as indicated by the arrow and collapses downward. Furthermore, at the corner between the ranges C and D, the weather strip 4' is bent about 90° with the seal part faced backwards. In this case, the bending central axis (d) is as indicated at 4' (D). That is, the axis (d) is located in the upper portion of the weather strip. Hence, the lower portion of the weather strip is pulled, as a result of which the weather strip is deformed in such a manner that the hollow seal part 42 and the body seal lip 43 fall upwards as indicated by the arrow.

The above-described deformation of the hollow seal part 42 and the body seal lip 43 at the corners makes the sealing line of the weather strip irregular, thus lessening the sealing effect of the weather strip.

Figure 6:
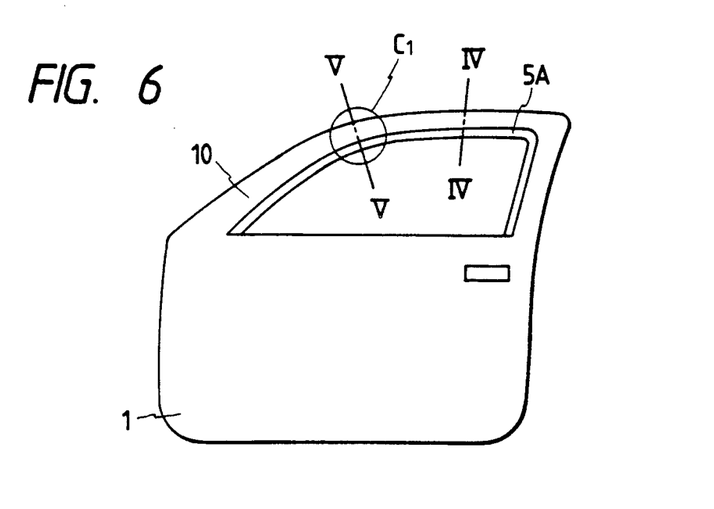
FIG. 6 is a front view of a door of an automobile.
Figure 11:
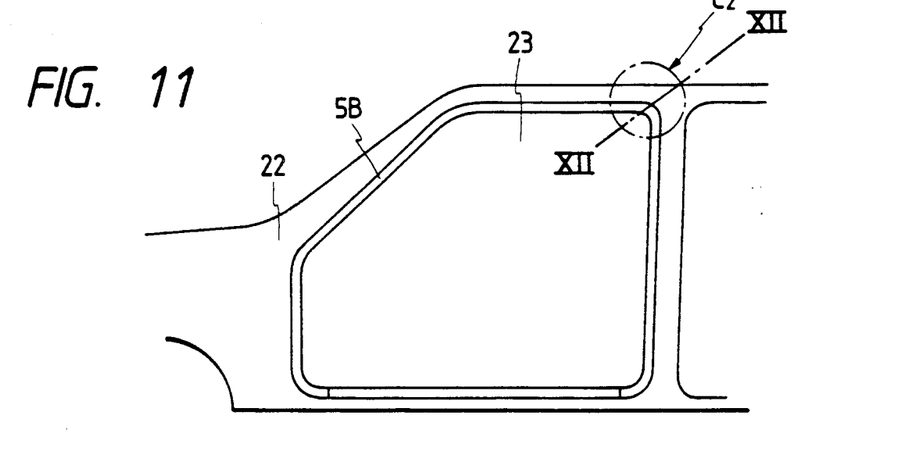
FIG. 11 is a front view of a door opening in a vehicle body.

In the case of a door window of an automobile, as shown in FIG. 6, a weather strip 5A is provided along the inner periphery of a door frame 10 which forms a window opening in a door 1. As shown in FIG. 11, a weather strip 5B is provided along a door opening 23 in a body panel 22. In general, each of these weather strips includes a trim part U-shaped in section engaged with a flange provided along the door opening 23 or door frame 10 and a seal part extending from the trim part so that it is located away from the vehicle body when installed.

Figure 9:
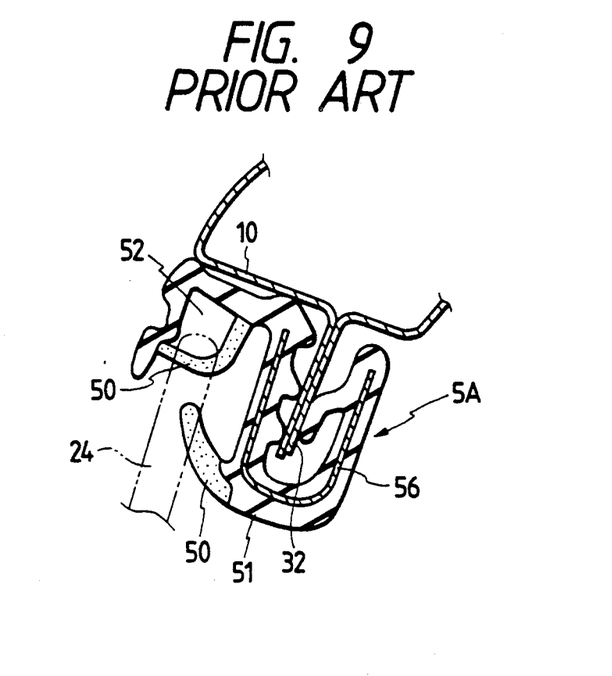
FIGS. 9 and 10 are sectional views of the weather strip taken along lines IV—IV and V—V in FIG. 6, respectively.

FIG. 9 shows the structure of the door weather strip 5A. The trim part 51 is engaged with a flange 32 of the door frame 10. The seal wall 50 of the seal part 52 is pushed by the edge of a window glass plate 24 as the glass plate 24 is moved so as to close the window. A separable core member 56 (which is separable into a plurality of core pieces) is buried in the trim part 51.

Figure 10:
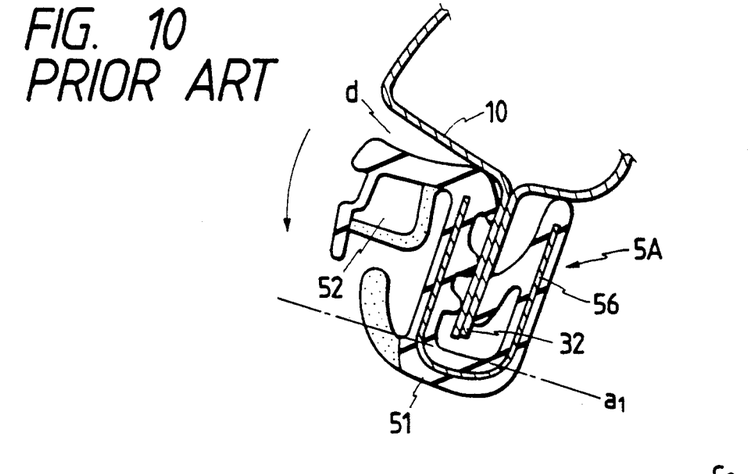

When the weather strip 5A is bent at the corner $C_1$ (FIG. 6) with the opening of the trim part 51 on the outside diameter side, then, as shown in FIG. 10 the bending central axis ($a_1$) is formed in the bottom portion on the inner diameter side. Therefore, a tensile force acts on the outer diameter side, so that the seal part 52 falls in the direction of the arrow that is, it falls away from the door frame 10. As a result, the sealing line shifts, and a gap (d) is formed between the door frame 10 and the weather strip 5A, thereby lessening the sealing effect of the weather strip 5A.

Figure 12:
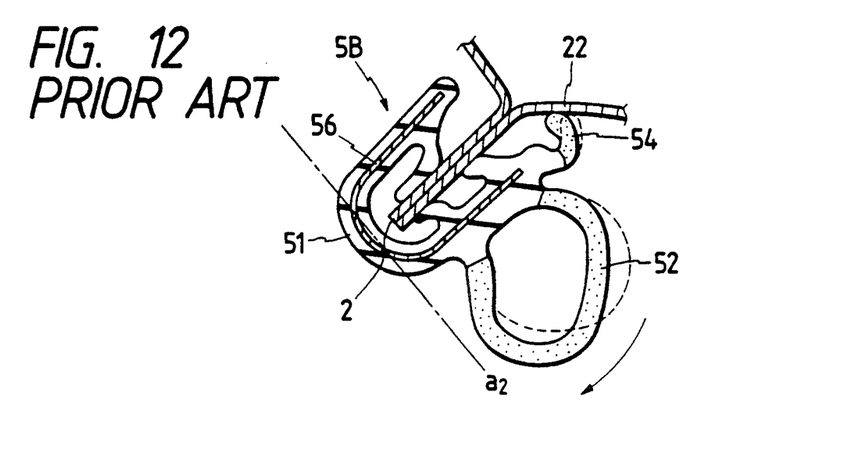
FIG. 12 is a sectional view of the conventional weather strip taken along line XII—XII in FIG. 11.

FIG. 12 shows the weather strip 5B provided along the door opening 23. The trim part 51 is engaged with the flange 2 of the door opening 23 in the body panel 22. The seal part 52 is pushed by the door frame 10 when the door is closed. When the weather strip 5B is bent at the corner $C_2$ (FIG. 11), the bending central axis ($a_2$) is formed in the bottom portion on the inner diameter side. Therefore, the seal part 52 (which is originally shaped as indicated by the broken line) is caused to disform in the direction of the arrow. At the same time, the body seal lip 54 extending from the trim part 51 is also caused to fall, thus lessening the sealing effect of the weather strip 5B.

SUMMARY OF THE INVENTION

In view of the foregoing, an object of this invention is to provide a weather strip whose seal part is scarcely deformed even when the weather strip is engaged with a flange which is three-dimensionally changed both in posture and in direction or even when the weather strip is bent at a mounting corner, thus providing an improved sealing characteristic.

The foregoing object and other objects of the invention have been achieved by the provision of a weather strip which, according to the invention, comprises: a trim part U-shaped in section which is to be engaged with a flange provided along the edge of an opening in a vehicle body, a seal part connected through a connecting portion to the trim part, the seal part being pushed by a structure adapted to open and close the opening in the vehicle body, a core member comprising a plurality of U-shaped core pieces, the core member being buried in the trim part in such a manner that the core pieces are separable from one another, and support means buried near the connecting portion, to prevent the seal part and the trim part from undesirable deformation or fall.

The nature, principle and utility of the present invention will become more apparent from the following detailed description when read in conjunction with the appended claims and the accompanying drawings, in which like parts are designated by like reference numerals or characters.

DETAILED DESCRIPTION OF THE PRESENTLY PREFERRED EXEMPLARY EMBODIMENTS

A first embodiment of this invention will be described with reference to FIG. 1, which is a weather strip 4 provided along the opening of a luggage room.

Figure 1:
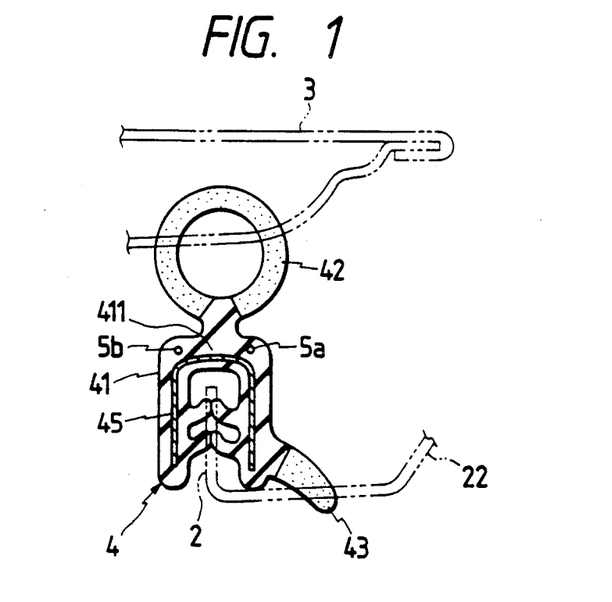
FIG. 1 is a sectional view showing a first example of a weather strip according to this invention.

The weather strip 4, as shown in FIG. 1, includes a trim part 41 U-shaped in section and made of solid rubber, a hollow seal part 42 of sponge rubber extending from the top portion 411 of the trim part 41, and a body seal lip 43 of sponge rubber extending from one of the two opposite walls forming the trim part 41. A core member is embedded in the trim part 41. The core member is made up of plurality of core pieces 45 U-shaped in section that are arranged at predetermined intervals in the weather strip 4.

Two wires 5a and 5a are buried in the trim part's top portion 411 at both ends, respectively, in such a manner they are extended in the weather strip 4 longitudinally and they are not in contact with the core pieces 45. The wires 5a and 5b are preferably made of polyester or polyamide. It is desirable that the wires 5a and 5b are fixedly held in the weather strip. For this purpose, for instance knots should be provided along the wires.

The weather strip is manufactured by the following process. First, a core material is formed by connecting a plurality of core pieces 45 with bridges in such a manner that they can be separated from one another with ease. Then, having the core material thus formed, a rubber material is formed into a flat plate by extrusion molding. The flat plate is bent in a widthwise direction to break the bridges and thereby separate the core pieces 45 from one another. The flat plate thus processed is bent so as to be U-shaped in section.

FIG. 2 shows an automobile's luggage room 11 to which the weather strip 4 is applied. The luggage room 11 is designed so that the middle portion of the rear wall is removed, and instead, a vertical wall 31 is extended from the rear edge of the luggage room door 3.

The edge of the opening of the luggage room 11 is a flange 2 as shown in FIG. 1. The trim part 41 of the weather strip 4 is engaged with the flange 2 in such a manner that the body seal lip 43 is in contact with the body panel. The hollow seal part 42 is pushed by the luggage door 3 when the luggage room is closed.

Figure 3:
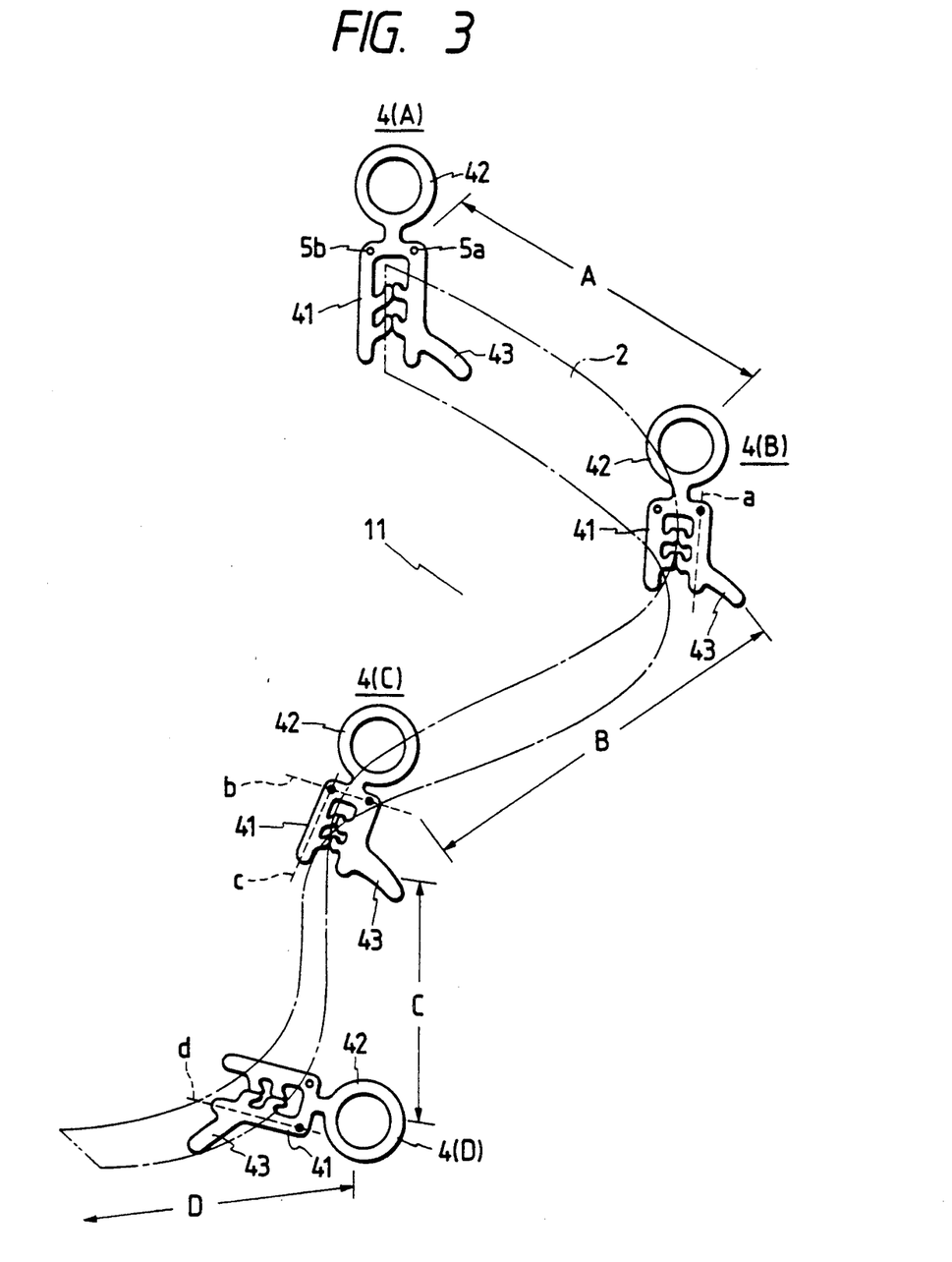
FIG. 3 is a drawing showing how the weather strip of the invention is applied to the luggage room.

FIG. 3 shows how the weather strip 4 is engaged with the flange 2. That is, the weather strip 4 is engaged with the flange 2 to cover the ranges A, B, C and D in the stated order. At the corner between the ranges A and B, as indicated at 4(B), the weather strip is held upright and bent inwards of the luggage room. In this operation, the outer diameter side of the weather strip, which would be otherwise elongated, is prevented from elongation by the wire 5a. That is, the weather strip is bent in such a manner that its inner diameter side is compressed forming a bending central axis (a) in the outer diameter side. Hence, the hollow seal part 42 will not fall inwardly of the luggage room 11, nor will the body seal lip 43 bend downwards.

At the corner between the ranges B and C, as indicated at 4(C) the weather strip 4 is bent in such a manner that it is laid vertical and faces backwards of the vehicle body. When the weather strip 4 is laid vertical, its outer diameter side, namely, the trim's top portion 411, in this case, which is otherwise elongated, is prevented from elongation by the wires 5a and 5b. Hence, the weather strip bends in such a manner that the inner diameter side, namely, the opening of the trim part is compressed forming a bending central axis (b) in the outer diameter side. As a result, the hollow seal part 42 does not collapse due to elongation. On the other hand, when the weather strip faces backwards as described above, the outer diameter side, which is on the side of the luggage room 11 is prevented from being elongated by the wire 5b. Hence, the inner diameter side which is outside the luggage room is compressed about a bending central axis (c). Accordingly, the hollow seal part 42 is prevented from falling outwards of the vehicle body.

At the corner between the ranges C and D, as indicated at 4(D), the weather strip 4 is bent in such a manner that it is held facing backwards from the vehicle body and its lower portion is the bending outer diameter side. In this operation, the lower portion, which is otherwise elongated, is prevented from being elongated by the wire 5a. That is, the bending of the weather strip is carried out in such a manner that its inner diameter side, namely, the upper portion is compressed about a bending central axis (d). Hence, the hollow seal part 42 and the body seal lip 43 is prevented from falling upwards.

Figure 4:
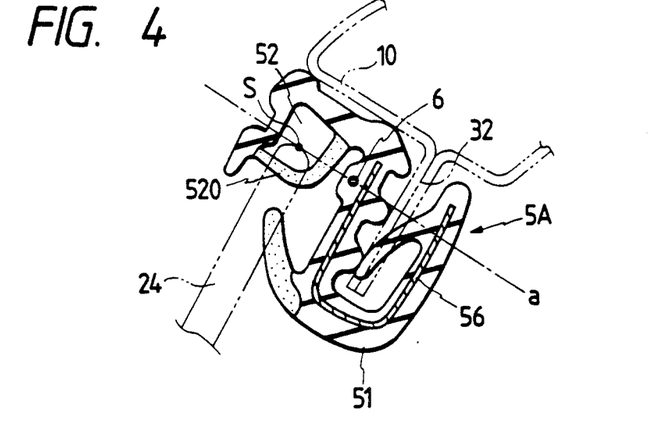
FIG. 4 and 5 are sectional views showing second and third examples of the weather strip according to the invention, respectively.

FIG. 4 shows a second embodiment of the invention, a weather strip 5A applied to a door frame 10.

The weather strip 5A is formed by extrusion. The weather strip 5A comprises a trim part 51 of solid rubber, and a hollow seal part 52 whose seal wall 520 is formed of sponge rubber. The trim part 51 is U-shaped in section. Similarly as in the above-described first embodiment, a separable core member 56 made up of a plurality of core pieces U-shaped in section is embeded in the trim part 51. The trim part 51 is engaged with the flange 32 provided along the door frame 10.

The seal part 52 is extended from the trim opening end of the side wall which is one of the two side walls forming the trim part 51 and comes outside the vehicle body when installed. The seal wall 520 is pushed upwardly by the edge of a door glass plate 24 when the door is closed. In this operation, the seal point of the seal wall 520 with the door glass plate 24 is as indicated at S in FIG. 4. The seal point S forms a continuous seal line on the weather strip longitudinally.

In the trim part 51, a wire 6 is buried in its side wall which comes outside the vehicle body, or is on the side of the seal part 52. More specifically, the wire 6 is positioned on an axis (a) that extends through the seal point S in a widthwise direction of the weather strip 5A. The wire 6 is not in contact with the core member 56. The wire 6 is made of synthetic resin such as polyester or polyamide, and it is buried in the weather strip 5A when the weather strip 5A is formed by extrusion.

When, in order to lay the weather strip 5A with the wire 6 along the flange 32, the weather strip is bent at the corner C1 of the door frame 10 (FIG. 6), the trim part 51 is bent about the axis (a) on which the wire 6 is positioned. Accordingly, the seal part 52 is scarcely deformed near the seal point, and the seal line is not shifted over the entire length of the weather strip including the corner C1. Furthermore, this operation is free from the difficulty where, as shown in FIG. 10, a gap (d) is formed between the door frame 10 and the seal part 52.

Figure 5:
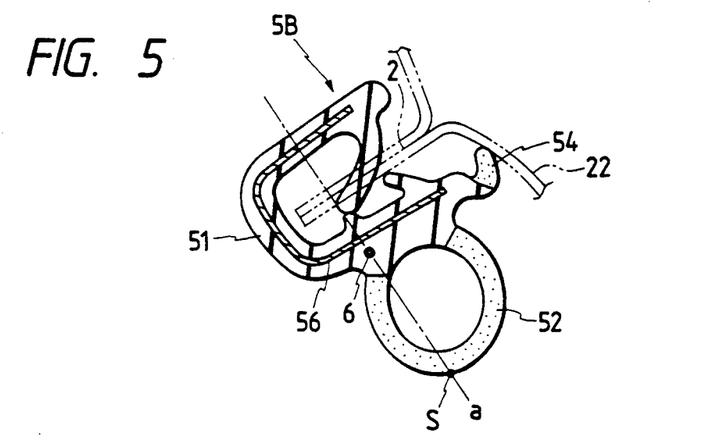

FIG. 5 illustrates a third embodiment of the invention, a weather strip 5B applied to the periphery of a door opening in the vehicle body.

The weather strip 5B comprises a trim part 51 being U-shaped in section and having two side walls, the trim part 51 being engaged with a flange 2 provided along the periphery of a door opening 23 in a body panel 22 and a hollow seal part 52 that extends from the middle portion of the outer side wall of the trim part 51 which comes outside the body panel when installed. A body seal lip 54 extends from the end of the outer side wall of the trim part 51. Similarly as in the above-described first and second embodiments, a separable core member 56 made of a plurality of U-shaped core pieces is embeded in the trim part. A wire 6 is embedded in the outer side wall of the trim part 51, which is on the side of the seal part 52, in such a manner that it is on an axis (a) that extends through the seal point S of the seal part 52 with the door in the direction of width of the weather strip. The wire 6 is not in contact with the core member 56.

When, in order to engage the weather strip 5B with the flange 2, the weather strip 5B is bent at the corner C2 (FIG. 11), the trim part 51 is bent about the axis (a). Hence, the seal part 52 is scarcely deformed, and the seal line is not shifted. The degree of falling of the body seal lip 54 is somewhat reduced because, in this case, the bending central axis for the body seal lip 54 is closer than in the case of the conventional weather strip. Thus, the weather strip is sufficiently engaged with the body panel 22 so as to provide a good seal. As is apparent from the above description, even if the flange with which the weather strip of the invention is to be engaged is three-dimensionally changed, or the weather strip is bent at a corner, the seal part of the weather strip will not fall, and the weather strip is engaged with the flange uniformly over its entire length and thereby provides a good seal.

The reason why the wires are buried in the trim part in such a manner so that they are not in contact with the core member is as follows. If the wires are in contact with the core member, then the wire-buried portion of the weather strip in which the wire or wires are buried is not elongated even if pulled while being on the outer diameter side, and therefore the weather strip will not smoothly follow the flange at the corner. That is, it would be rather difficult to sufficiently engage the weather strip with the flange. On the other hand, when the weather strip of the invention is bent with its wire-buried portion on the outside diameter side, the wire or wires are moved somewhat inwards while pushing the rubber material. This movement reduces resistance against the bending, so that the weather strip can be laid smoothly along the flange. The above-described movement of the wire or wires is so slight that it will not adversely affect the deformation of the seal part.

The edge of the opening of a luggage room is not constant in length; that is, sometimes it is longer or shorter than the predetermined value. Therefore, in laying the weather strip along the edge of the opening of the luggage room, sometimes the weather strip is shorter or longer than the actual length of the edge of the opening. Hence, it is preferable that not only the wire or wires buried in the weather strip is not in contact with the core member, but also instead of metal wires, resin wires which are somewhat expandable are buried in the weather strip.

While there has been described in connection with the preferred embodiments of this invention, it will be obvious to those skilled in the art that various changes and modifications may be made therein without departing from the invention, and it is meant, therefore, to cover in the appended claims all such changes and modifications as fall within the true spirit and scope of the invention.

What is claimed is:

1. A weather strip for a vehicle comprising:
a trim part U-shaped in section for engaging a flange formed along an edge of an opening in a vehicle body, said trim part including two opposite side walls connected through a common top portion to each other ,and defining a shoulder portion at the juncture of each side wall and the top portion and a separable core member;
a seal part protruding from said common top portion of said two opposite side walls, said seal part being pushed by an outer peripheral portion of a member adapted to open and close said opening in said vehicle body; and
an unextendable cord disposed in each shoulder portion, within the strip so that said cord extends in said weather strip longitudinally and is set away form said core member.

2. A weather strip as claimed in claim 1, wherein said cord is made from a member selected from the group consisting of polyester and polyamide.

3. A weather strip for a vehicle comprising:

a trim part U-shaped in section for engaging with a flange formed along an edge of an opening in a vehicle body, said trim part including a core member, said trim part including first and second side walls opposite one another connected by a common top portion with a shoulder portion being formed at the juncture of each side wall with the top portion;

a seal part formed on one side of said trim part which protrudes outside of said vehicle body when said weather strip is attached to a vehicle, said seal part being pushed by an outer peripheral portion of a structure adapted to open and close said opening in said vehicle body; and an enextendable cord buried in each shoulder portion of said trim part near an axis that extends through a seal point of said seal part when said opening is closed with said structure, said cord extending in a width wise direction of said weather strip in such a manner that said cord extends longitudinally in said weather strip and is set away from said core member.

4. A weather strip comprising:

a trim part U-shaped in section for engaging a flange provided along an edge of an opening in a vehicle body, said trim part including opposite first and second side walls and a common upper portion with shoulder portions being defined by a juncture of each side wall with the common upper portion;

a connecting portion;

a seal part connected via said connecting portion to said trim part, said seal part being pushed by a structure adapted to open and close said opening in said vehicle body;

a core member buried in said trim part; and support means buried near said connection portion in each of said shoulder portions, to prevent said seal part and trim part form undesirable deformation or bending.

5. A weather strip as claimed in claim 4, wherein said support means is a cord extending longitudinally in said weather strip.

6. A weather strip as claimed in claim 4, wherein said support means is buried in such a manner that said support means does not contact said core member.

* * * * *